United States Patent Office 3,397,221
Patented Aug. 13, 1968

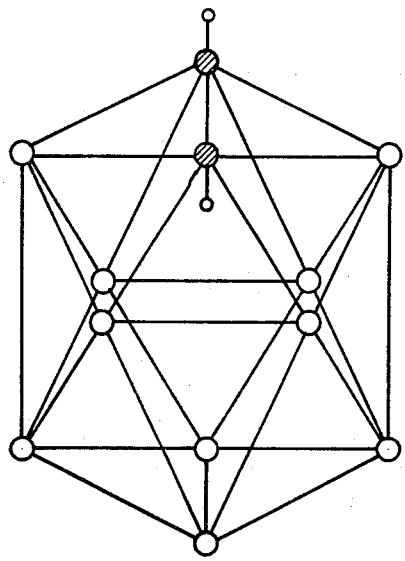
A
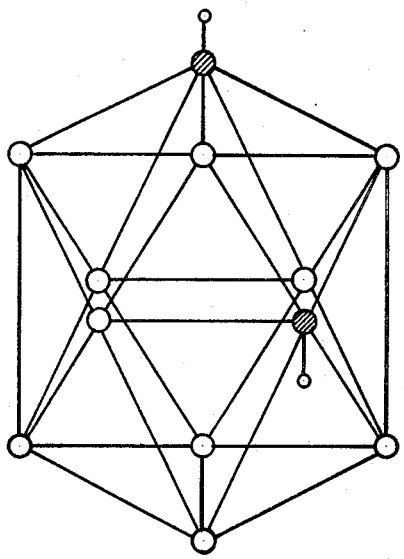
B
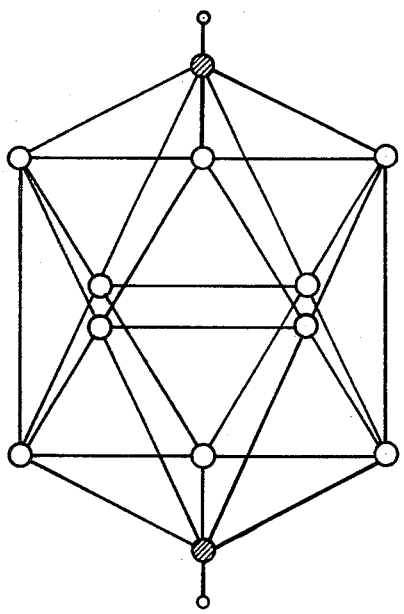
C
○ BORON
◉ CARBON
o HYDROGEN ON CARBON (HYDROGEN ATOMS ON BORON OMITTED FOR CLARITY)
INVENTOR.
STELVIO PAPETTI
BY
AGENT

3,397,221
ORGANOSILOXANE CONTAINING CARBORANES
AND PROCESS THEREFOR
Stelvio Papetti, Hamden, Conn., assignor to Olin
Mathieson Chemical Corporation, a corporation
of Virginia
Filed June 21, 1965, Ser. No. 465,499
9 Claims. (Cl. 260—448.2)

ABSTRACT OF THE DISCLOSURE

Silicon-containing organoborane compounds are prepared by reacting meta-carborane or para-carborane derivatives of the formula:

HCB$_{10}$H$_8$RR'CH where R and R' are hydrogen or alkyl, with an alkali metal alkyl to form the corresponding di(alkali metal) derivative which, in turn, is reacted with a disiloxane. The compounds of this invention react with dialkoxy silanes in the presence of ferric chloride to form high temperature resisatnt linear polymeric products which can be cured to yield compositions useful in high temperature and high pressure applications.

---

This invention relates to silicon-containing organoboron compounds and a process for their preparation.

The novel compounds are prepared by reacting an organoborane compound of the formula:

HCB$_{10}$H$_8$RR'CH wherein R and R' are each selected from the group consisting of hydrogen and an alkyl radical containing from 1 to 5 carbon atoms, with an alkali metal alkyl to form the corresponding di(alkali metal) derivative of the starting compound, which in turn, is reacted with a disiloxane of the formula:

wherein X is a halogen selected from the group consisting of chlorine, bromine and iodine and each R" is independently selected alkyl of from 1 to 12 carbon atoms or aryl of not more than 10 carbon atoms. Both stages of the reaction are conducted in the presence of an inert organic solvent.

The novel silicon-containing organoboron compounds of this invention have the formula:

wherein R, R' and R" and X have the same meaning as previouslly described.

The organoboron compounds employed as starting materials in the process of this invention include both meta-carboranes (i.e., m-carboranes) and para-carboranes. m-Carboranes can be prepared by heating the corresponding ortho-carborane in a sealed tube at a temperature of from about 400°–525° C. for about 5 to about 20 hours. Orthocarboranes can be made by the reaction of decaborane or an alkylated decaborane having 1 to 2 alkyl groups containing 1 to 5 carbon atoms in each alkyl group with an acetylenic hydrocarbon containing from 2 to 10 carbon atoms in the presence of a wide variety of ethers, nitriles or amines. The preparation of these compounds is described in application Ser. No. 813,032, filed May 13, 1959 of Ager, Heying and Mangold. For example, the compound ortho-carborane,

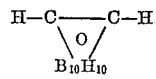

can be prepared by reacting for about 12 hours at 125° C. a mixture of decaborane and tetrahydrofuran in an autoclave pressured to 100 p.s.i. with acetylene.

The preparation of decaborane is known in the art. Lower alkyls of decaborane such as monomethyldecaborane, dimethyldecaborane, monoethyldecaborane, diethyldecaborane, monopropyldecaborane and the like, can be prepared, for example, according to U.S. Patent 2,999,117 of Altwicker, Garrett, Weilmuenster and Harris.

When ortho-carborane, that is, the compound:

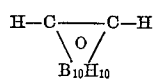

is heated in a sealed tube at a temperature of about 475° C. for about 10 hours, m-carborane, which is designated by the formula:

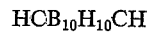

is formed. Para-carboranes (i.e., p-carboranes) can also be utilized as starting materials in the process of this invention. Para-carboranes, likewise, can be derived from the corresponding m-carborane compound. For example, if m-carborane is heated in a pressure bomb at a temperature of from about 550° C. to about 620° C. for about 1 to 30 hours or more, p-carborane is obtained.

In this specification, the formula:

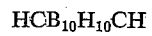

is utilized to represent both m- and p-carborane.

The structural formula of the compound ortho- or o-carborane is shown as structural Formula A in the figure, the structural formula of m-carborane is shown as structural Formula B in the figure, while the structural formula of p-carborane is shown as structural Formula C in the figure.

Organoboron compounds which can be employed as starting materials in the process of this invention include m-carborane, B-ethyl-m-carborane, B-dimethyl-m-carborane, B-n-propyl-m-carborane, B-di-n-butyl-m-carborane, B-diisobutyl-m-carborane, B-di-n-butyl-m-carborane, B-diisobutyl-m-carborane, B-n-propylisobutyl-m-carborane, etc., and the corresponding para-carborane compounds.

In the first stage of the process the ratio of the reactants can be varied widely and generally will be within the range of from about 2.0 to about 10 moles or more of the alkali metal alkyl per mole of the organoboron compound employed and preferably in the range from about 2 to about 4.5 moles of the alkali metal alkyl per mole of the organoboron compound utilized. The temperature of the reaction of the organoboron compound with the alkali metal alkyl generally is maintained between about −90° C. and +50° C. and preferably at or below room temperature. Although atmospheric pressure reactions are convenient, subatmospheric pressures up to pressures of about 5 atmospheres or more can be employed if desired. The reaction of the alkali metal alkyl compound with the organoboron compound is substantially instantaneous. In order to prevent overheating the slow addition of the alkali metal alkyl compound to the reaction mixture is practiced.

The amount of the disiloxane employed in the second stage of the novel process of this invention can also be varied widely and generally will be from not less than 2 moles of the disiloxane compound up to about 10 moles or more per mole of the organoboron compound charged to the initial step of the reaction. Preferably, from about 2 to about 4.5 moles of the disiloxane will be utilized per mole of the organoboron compound added to the reactor in the initial step. The pressure employed in the second phase of the reaction can be varied widely although atmospheric pressure reactions are convenient. In the second phase, the reaction temperature is maintained between about −90° C. and about +50° C. with the preferred temperature being from about −50° C. to about +40° C.

Recovery of the di(alkali metal) derivative of the starting organoboron compound can be accomplished in a variety of ways. In order to completely precipitate the dialkali metal salt it is desirable to add a hydrocarbon such as pentane, hexane or heptane to the reaction mixture. Then the liquid portion of the reaction mixture can be siphoned off through a fritted glass sparger following which the solid product remaining is washed with a material, such as hexane, heptane, pentane, benzene, etc. From the second stage reaction mixture the final product can be recovered by a number of methods well known in the art such as, for example, by filtering the reaction mixture followed by evaporation of the filtrate to dryness.

Both stages of the reaction are preferably carried out in the presence of an inert solvent. A wide variety of inert solvents other than the lower dialkyl ethers, as exemplified by the diethyl ether employed in the specific examples can be utilized. Such solvents include, for example, diethyl ether, methyl ethyl ether, diisopropyl ether, di-n-propyl ether, ethyl-n-butyl ether, ethylene glycol dimethyl ether, dioxane and tetrahydrofuran and mixed solvents, such as diethylether-pentane, di-n-propyl ether-heptane, dioxane-hexane, etc. In the second stage reaction hydrocarbons, such as pentane, hexane, heptane, etc. can also be used.

The reaction time (total) generally will vary from about 0.5 to about 20 hours or more depending upon the reaction conditions employed.

Halogen-containing disiloxanes suitable as starting materials in the process of this invention include tetramethyldichlorodisiloxane, dimethyldi-n-propyldichlorodisiloxane, tetraethyldichlorodisiloxane, diethylpropylbutyldichlorodisiloxane, ethyldimethyl-n-propyldisiloxane, tetraisopropyldichlorodisiloxane, tetrapentyldichlorodisiloxane, diethyldipentyldichlorodisiloxane, tetrahexyldichlorodisiloxane, diheptyldi - n - octyldichlorodisiloxane, tetraisoheptyldichorodisiloxane, tetraisooctyldichlorodisiloxane, di - n - nonyldiisooctyldichlorodisiloxane, tetraphenyldichlorodisiloxane, tetratolyldichlorodisiloxane, diphenyldixylyldisiloxane, and tetraxylyldichlorodisiloxane etc., and the corresponding bromine and iodine derivatives.

The preferred alkali metal alkyls are the lithium alkyls such as methyl lithium, ethyl lithium, isopropyl lithium, n-propyl lithium, n-butyl lithium, sec-butyl lithium, t-butyl lithium, n-amyl lithium and the like, since they are soluble in the inert organic solvents employed. Other alkali metal alkyls, such as sodium and potassium, can also be employed as can the alkali metal aryls including phenyl lithium.

The novel silicon-containing organoboron compounds of this invention can be employed to prepare valuable high temperature resistant linear polymers which exhibit a high degree of inertness to solvent action is described in Heying, Papetti and Schaffling application Ser. No. 465,437 for Composition and Method filed of even date herewith. For example, when equimolar quantities of bis(1,1,3,3-tetramethyl - 3 - chlorodisiloxanyl) - m-carborane and diethoxydimethylsilane are heated together in the presence of ferric chloride at a temperature of from about 150° C. to 225° C. a linear polymeric condensation product is formed. Such products, when compounded with inert fillers and a curing catalyst can be cured to yield compositions which are suitable for the manufacture of bushings and gaskets useful in high temperature and high pressure applications.

EXAMPLE I (A) Preparation of Dilithio-m-Carborane
($LiCB_{10}H_{10}CLi$)

m-Carborane ($HCB_{10}H_{10}CH$) in an amount of 48.59 g. (0.34 mole) in 150 ml. of anhydrous ethyl ether was placed in 1000 ml., three-necked flask which was equipped with stirring bar, dropping funnel and condenser and connected to vacuum line. While cooling with an ice-water bath, 466 ml. (0.74 mole, 10 percent excess) of butyl lithium in hexane was added to the reaction flask. The reaction mixture was stirred for 30 minutes at room temperature and then 200 ml. of hexane, which had been previously dried over calcium hydride was added to increase the insolubility of dilithio-m-carborane product in the etherhexane mixture. The product was recovered by siphoning off the liquid portion of the reaction mixture (which contained the excess butyl lithium and other soluble impurities (through a fritted glass sparger. The solid dilithio-m-carborane product was washed twice with 300 ml. aliquots of hexane and, finally, the washed dilithio-m-carborane was dissolved in 300 ml. of anhydrous ethyl ether.

(B) Preparation of Bis(1,1,3,3-tetramethyl-3-chlorodisiloxanyl)m-carborane

A total of 150.54 g. of 1,1,3,3-tetramethyl-1,3-dichlorodisiloxane (0.74 mole) together with 400 ml. of anhydrous ethyl ether was placed in a round-bottomed, 1000 ml., three-necked flask, equipped with stirring bar. While cooling with an ice-water bath, the dilithio-m-carborane solution previously prepared was added slowly to the flask through a special adapter. The reaction mixture was stirred at room temperature for 2.5 hours and then filtered. After the filtrate had been taken to dryness, the liquid residue was distilled under reduced pressure through a 4 inch Vigreaux column equipped with condenser and a multiple distilling receiver. The compound bis(1,1,3,3 - tetramethyl-3-chlorodisiloxanyl) - m - carborane having the formula:

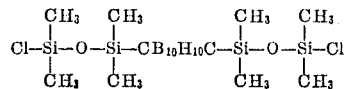

was obtained in 65 percent yield (B.P. 128–.5° C. at 0.08 mm. Hg).

The product was analyzed for carbon, hydrogen, boron and chlorine and the following resuls were obtained:

Calc'd for $C_{10}H_{34}B_{10}O_2Si_4Cl_2$: C, 25.14; H, 7.17; B, 22.64; Cl, 14.84. Found: C, 25.03; H, 7.11; B, 23.01; Cl, 15.10.

EXAMPLE II

Preparation of Bis(1,1,3,3-tetramethyl-3-chlorodisiloxanyl)-m-carborane

The preparation of this compound was repeated using the same apparatus and method of Example I. In this experiment m-carborane (64.9 g., 0.45 mole) was reacted with 629 ml. of a solution of butyl lithium in hexane (1.0 mole, 15 percent excess) to form dilithio-m-carborane ($LiCB_{10}H_{10}CLi$) which, in turn, was reacted with 1,1,3,3-tetramethyl-1,3-dichlorodisiloxane (203.2 g., 1.0 mole) in diethyl ether in the manner described in Example I to give bis(1,1,3,3-tetramethyl-3-chlorodisiloxanyl) m-carborane in 67 percent yield.

What is claimed is:

1. A process for the preparation of silicon-containing organoboron compound which comprises (A) reacting a compound of the formula:

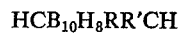

wherein R and R′ are each selected from the group consisting of hydrogen and alkyl of from 1 to 5 carbon atoms with an alkali metal alkyl to form the corresponding di(alkali metal) derivative of the said compound, and (B) reacting the said di(alkali metal) derivative with a disiloxane of the formula:

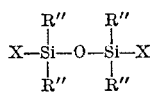

wherein X is a halogen selected from the group consisting of chlorine, bromine and iodine and each R″ is independently selected from the group consisting of alkyl of from 1 to 12 carbon atoms, and aryl of not more than 10 carbon atoms both said reactions being conducted in the presence of an inert organic solvent.

2. The process of claim 1 wherein reactions (A) and (B) are carried out at a temperature of from about −90° C. to about +50° C.

3. The process of claim 1 wherein the inert organic solvent is diethyl ether.

4. The process of claim 1 wherein the said disiloxane is 1,1,3,3-tetramethyl-1,3,-dichlorodisiloxane.

5. The process of claim 1 wherein the said alkali metal alkyl is butyl lithium.

6. The process of claim 1 wherein the said compound is $HCB_{10}H_{10}CH$.

7. The process for the preparation of bis(1,1,3,3-tetramethyl-3-chlorodisiloxanyl) m-carborane which comprises (A) reacting $HCB_{10}H_{10}CH$ with butyl lithium to form $LiCB_{10}H_{10}CLi$ and (B) reacting the thus-formed $LiCB_{10}H_{10}CLi$ with 1,1,3,3-tetramethyl-1,3-dichlorodisiloxane, at a temperature of from about −90° C. to about +50° C. and in the presence of diethyl ether.

8. A silicon-containing organoboron compound of the formula:

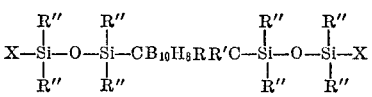

wherein X is a halogen selected from the group consisting of chlorine, bromine and iodine, R and R′ are each selected from the group consisting of hydrogen and alkyl of from 1 to 5 carbon atoms, and each R″ is independently selected from the group consisting of alkyl of from 1 to 12 carbon atoms and aryl of not more than 10 carbon atoms.

9.

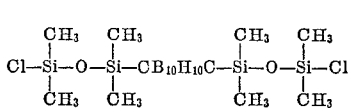

References Cited
UNITED STATES PATENTS

| | | | |
|---|---|---|---|
| 2,957,900 | 10/1960 | Groszos | 260—448.2 |
| 3,137,719 | 6/1964 | Papetti | 260—448.2 |
| 3,154,520 | 10/1964 | DuPont et al. | 260—448.2 XR |
| 3,321,505 | 5/1967 | Fein et al. | 260—448.8 |

TOBIAS E. LEVOW, *Primary Examiner.*

P. F. SHAVER, *Assistant Examiner.*